C. F. BARKER.
TOWING ATTACHMENT FOR TRACTORS.
APPLICATION FILED MAY 3, 1918.
1,297,057.
Patented Mar. 11, 1919.
2 SHEETS—SHEET 2
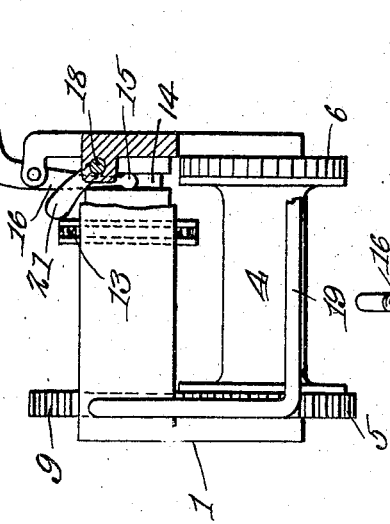
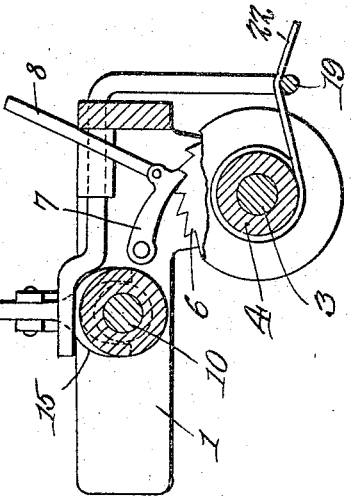
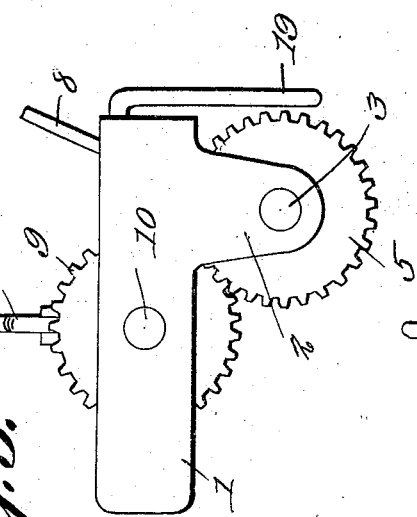
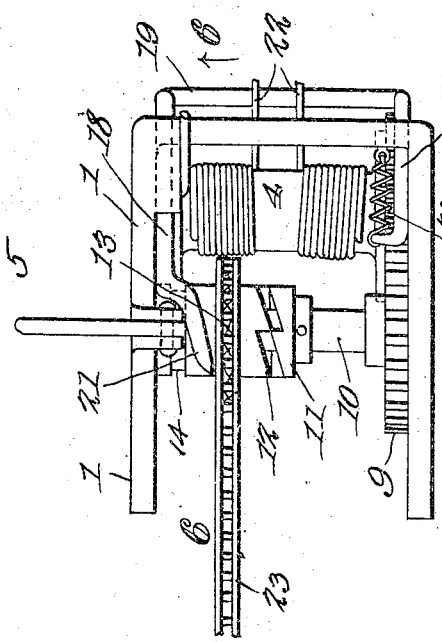
C. F. Barker, Inventor,
By C. A. Snow & Co.
Attorneys
Witness
J. R. ...

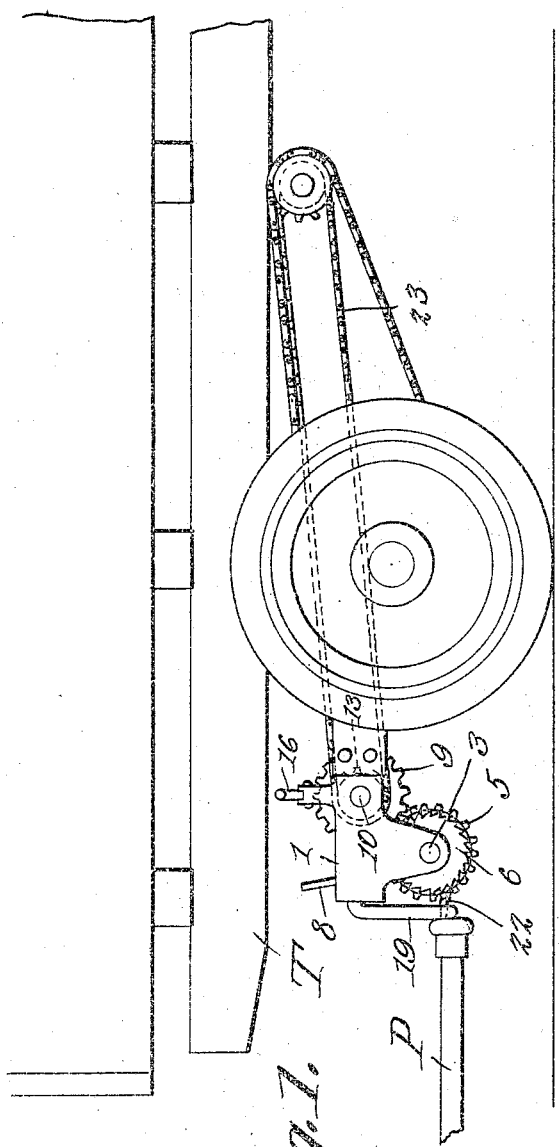
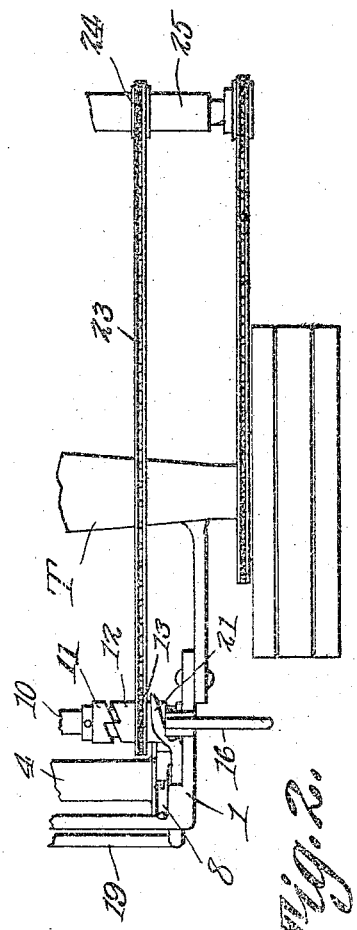

UNITED STATES PATENT OFFICE.

CHARLES F. BARKER, OF PONCA, NEBRASKA.

TOWING ATTACHMENT FOR TRACTORS.

1,297,057.  Specification of Letters Patent.  Patented Mar. 11, 1919.

Application filed May 3, 1918. Serial No. 232,368.

*To all whom it may concern:*

Be it known that I, CHARLES F. BARKER, a citizen of the United States, residing at Ponca, in the county of Dixon and State of Nebraska, have invented a new and useful Towing Attachment for Tractors, of which the following is a specification.

This invention relates to an attachment for tractors and the like used for towing, one of the objects being to provide an attachment to be secured to or formed on the tractor and to which the towing cable or chain is connected, means being employed whereby the power mechanism of the tractor can be utilized to control the action of the attachment so that, when desired, the tractor can be relieved of the restraining action of the towed load by paying out the cable or chain, after which said cable or chain can be taken up to return the said load to its initial position relative to the tractor.

A further object is to provide an attachment of this character which is especially useful by allowing a tractor to pass over a mud hole or the like while paying out the cable connection with the towed load after which, by winding up the said connection, the said load can be drawn over the mud hole and up to the tractor.

A further object is to provide an attachment of this character which will automatically stop winding the cable or chain when the towed load is brought to position close to the tractor.

With the foregoing and other objects in view the invention consists of certain novel details of construction and combinations of parts which will be hereinafter more fully described and pointed out in the claims, it being understood that various changes may be made in the construction and combination of parts without departing from the spirit of the invention as set forth in the appended claim.

In the accompanying drawings the preferred form of the invention has been shown.

In said drawings

Figure 1 is a side elevation of a portion of a tractor having the present improvements applied thereto.

Fig. 2 is a plan view of a portion of the attachment and showing one means which may be used to operate the same.

Fig. 3 is an elevation of one side of the attachment.

Fig. 4 is a rear elevation thereof, a part being broken away.

Fig. 5 is a plan view of the attachment.

Fig. 6 is a section on line 6—6, Fig. 5.

Referring to the figures by characters of reference, 1 designates the frame of the attachment the sides of which are provided with depending ears or bearing members 2. A shaft 3 is journaled in the ears 2 and secured to and revoluble with this shaft is a spool 4 provided at one end with a gear 5 and at its other end with a ratchet wheel 6. A pawl 7 is pivotally connected to one side of the frame 1 and normally engages the ratchet wheel 6 thus to hold the spool normally against rotation in one direction. This pawl may be provided with an arm 8 whereby it can be shifted readily for the purpose of releasing the ratchet wheel 6.

The gear 5 meshes with another gear 9 secured to a shaft 10 journaled in the sides of the frame 1. A clutch member 11 is secured to and rotates with this shaft and another clutch member is loosely mounted on said shaft and has been shown at 12. This clutch member 12 has a sprocket 13 secured thereto and adapted to rotate therewith and formed in one end portion of the clutch member 12 is an annular groove 14 into which projects the forked end 15 of a lever 16. The outer end of the lever is extended laterally from the frame 1 where it can be grasped and operated readily.

Slidably mounted in the back end of the frame 1 are the side arms 17 and 18 of a depending loop 19 constituting a push head which is arranged back of the frame 1. The free end of the arm 17 is connected by a spring 20 to the back end of the frame 1, thus to hold said loop or head 19 pressed backwardly away from the frame 1. The forward end of the other arm 18 is offset obliquely as at 21 and extends between the sprocket 13 and the forked end 15 of lever 16. Thus when the head or loop 19 is pressed toward the frame 1 and out of its normal position and against the action of spring 20, as shown in Figs. 5 and 6, the offset portion 21 of the arm 18 will hold the forked end of lever 16 pressed laterally and the clutch member 12 out of engagement with the member 11.

Towing cables or chains 22 are secured to the ends of the spool and are adapted to be wound thereon, said cables passing through the loop 19.

The frame 1 can be built into a tractor or can be attached thereto at any desired point. The sprocket 13 is adapted to receive motion through a chain 23 from a sprocket 24 on the transmission shaft 25, or the said sprocket 13 can be driven in any other manner desired. In Figs. 1 and 2 a portion of a tractor has been shown at T and the pole of the towed vehicle has been shown at P.

In using the attachment the cables 22 are attached to the pole P and the clutch member 12 is shifted by lever 16 so as to engage the clutch member 11. The operation of the chain 23 will thus cause motion to be transmitted to the shaft 10 and, through gears 9 and 5, to the spool 4 with the result that the cables will be wound on the spool and will draw the pole P toward the tractor. The pole will ultimately come against the head or loop 19 and press it toward the frame 1 and against the action of spring 20. This will cause the end 21 of arm 18 to shift the fork 15 laterally and disengage the two clutch members with the result that motion will no longer be transmitted to the spool. The pawl 7 will prevent the cable from unwinding from the spool. Should the tractor become lodged in a mud hole and be unable to extract itself while pulling the towed vehicle, the operator could shift the pawl 7 from engagement with the ratchet. This would allow the tractor to move forwardly without pulling the trailing vehicle but without disconnecting them from each other. After the tractor has reached a firm and solid surface the clutch member 12 can be shifted as hereinbefore described so that the cables will be wound on the spool and the trailer drawn through the mud and up to the tractor. When the pole P comes against the loop or head 19 the operation of the spool will cease, as before pointed out and the tractor can continue with its trailing load.

What is claimed is:

A towing device for tractors and the like including flexible trailer engaging means, a winding element therefor, drive mechanism, means including relatively movable clutch members for coupling the drive mechanism to the winding element to take up the flexible element, means for preventing unwinding of said flexible element, and means operated by the trailer for uncoupling the drive mechanism from the winding element, said means including a trailer actuated member, yielding means for holding said member normally in one position relative to the spool and means carried by said member and movable therewith when actuated by the trailer, to shift one of the clutch members.

In testimony that I claim the foregoing as my own, I have hereto affixed my signature in the presence of two witnesses.

CHARLES F. BARKER.

Witnesses:
C. A. KINGSBURY,
OWEN McQUILLEN.